United States Patent
Güntherberg et al.

(12) 
(10) Patent No.: US 6,235,839 B1
(45) Date of Patent: May 22, 2001

(54) THERMOPLASTIC MOULDING COMPOUNDS

(75) Inventors: Norbert Güntherberg, Speyern; Martin Weber, Maikammer; Konrad Knoll, Ludwigshafe; Gerhard Lindenschmidt, Leimen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/254,917
(22) PCT Filed: Sep. 9, 1997
(86) PCT No.: PCT/EP97/04913
 § 371 Date: Mar. 17, 1999
 § 102(e) Date: Mar. 17, 1999
(87) PCT Pub. No.: WO98/12257
 PCT Pub. Date: Mar. 26, 1998

(30) Foreign Application Priority Data

Sep. 19, 1996 (DE) ............................. 196 38 256

(51) Int. Cl.⁷ .................................................. C08L 51/00
(52) U.S. Cl. ................................................................ 525/71
(58) Field of Search .................................................. 525/71

(56) References Cited

U.S. PATENT DOCUMENTS

| 5,250,617 | 10/1993 | Piejko et al. | |
|---|---|---|---|
| 5,654,365 | * 8/1997 | Havriliak, Jr. et al. | 525/98 |
| 5,877,258 | * 3/1999 | Guntherbberg et al. | 525/71 |

FOREIGN PATENT DOCUMENTS

| 2160952 | 4/1996 | (CA) . |
| 42 11 412 | 10/1993 | (DE) . |
| 526 813 | 2/1993 | (EP) . |
| 708 145 | 4/1996 | (EP) . |

OTHER PUBLICATIONS

JP 05279549—Derwent Abstract, Oct. 1993.
JP 06016890—Derwent Abstract, Jan. 1994.

* cited by examiner

Primary Examiner—Jeffrey Mullis
(74) Attorney, Agent, or Firm—Keil & Weinkauf

(57) ABSTRACT

Thermoplastic molding compositions comprising
 A) a graft polymer comprising
  1) an elastomeric graft core, obtainable by copolymerization of one or more $C_1$–$C_{10}$-alkyl acrylates, and a monomer with crosslinking effect, and
  2) a graft shell comprising a styrene compound or a $C_1$–$C_8$-alkyl acrylate or methacrylate, or a mixture of the styrene compound and the $C_1$–$C_8$-alkyl acrylate or methacrylate, and
 B) a thermoplastic polymer comprising
  C) an elastomeric block copolymer in which all or virtually all of the olefinic double bonds have been hydrogenated, comprising at least one block A, which forms a hard phase and contains, in its polymer chain, units of a vinylaromatic monomer, and/or a block B, which forms a first elastomeric (soft) phase and contains diene monomers, and at least one elastomeric block B/A, which forms a soft phase, and contains, randomly in its polymer chain, units of both a vinylaromatic monomer and a diene, where the glass transition temperature $T_g$ of the block A is above 25° C. and that of the block B/A is below 25° C. and the phase-volume ratio of block A to block B/A is chosen so that the proportion of the hard phase in the entire block copolymer is from 1 to 40% by volume and the proportion by weight of the diene is less than 50% by weight.

10 Claims, No Drawings

THERMOPLASTIC MOULDING COMPOUNDS

The present invention relates to halogen-free thermoplastic molding compositions comprising A) from 30 to 98% by weight of a graft polymer comprising
  $a_K$) from 30 to 90% by weight of an elastomeric graft core, obtainable by copolymerization of
    $a_K/1$) from 80 to 99.99% by weight of one or more $C_1$–$C_{10}$-alkyl acrylates,
    $a_K/2$) from 0.01 to 20% by weight of a monomer with crosslinking effect, and
    $a_K/3$) from 0 to 40% by weight of one or more other monoethylenically unsaturated monomers,
  $a_S$) from 10 to 70% by weight of a graft shell comprising
    $a_S/1$) from 50 to 100% by weight of a styrene compound of the formula

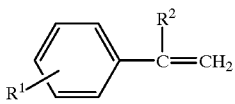

where $R^1$ and $R^2$ are hydrogen or $C_1$–$C_8$-alkyl, or a $C_1$–$C_8$-alkyl acrylate or methacrylate, or a mixture of the styrene compound and the $C_1$–$C_8$-alkyl acrylate or methacryate, and
    $a_S/2$) from 0 to 50% by weight of one or more other monoethylenically unsaturated monomers, B) from 1 to 50% by weight of a thermoplastic polymer comprising
  b1) from 50 to 100% by weight of styrene and/or α-methylstyrene,
  b2) from 0 to 50% by weight of acrylonitrile, and
  b3) from 0 to 50% by weight of one or more other monomers, and from 1 to 70% by weight of a component C, which is an elastomeric block copolymer in which all or virtually all of the olefinic double bonds have been hydrogenated, comprising at least two blocks A which contain, in their polymer chains, units of a vinylaromatic monomer, and have a glass transition temperature above 25° C., and, situated between the blocks A, at least one elastomeric block B/A which contains, randomly in its polymer chain, units of both a vinylaromatic monomer (A) and a diene (B) and has a random structure and a glass transition temperature Tg below 25° C., where the proportion in the entire block copolymer of the hard phase formed from the blocks B/A is from 1 to 40 volume % and the proportion of the diene is less than 50% by weight.

The invention relates, furthermore, to molding compositions in which component C) has a specific formulation, to the use of these molding compositions for producing films and shaped articles and to films and shaped articles made from these molding compositions.

Plastic films have various areas of application. Certain films, in particular flexible films with a leather-like appearance, are extensively used in interior decoration, for example of automobiles, or as leather substitutes. They are mostly produced by calendering or extrusion.

The main constituent of these films is currently usually polyvinyl chloride (PVC), which contains plasticizer and frequently also contains other vinyl polymers. However, the films have only limited resistance to aging, and furthermore the plasticizer which is used can exude out over the course of time.

EP-A 526 813 discloses thermoplastic molding compositions made from a highly crosslinked acrylate rubber with a graft shell of methyl methacrylate or styrene-acrylonitrile, a partially crosslinked acrylate rubber, an ethylene-vinyl acetate copolymer and, if desired, a further polymer based on styrene and/or acrylic compounds. Under the conditions of shaping, to give films for example, these materials tend, however, to undergo undesirable degradation reactions.

DE-A 42 11 412 recommends as a material for films mixtures which are made from styrene-acrylonitrile polymers and thermoplastics and which have a graft shell of an elastomeric polymer. The preparation of graft copolymers of this type is, however, technically complicated, so that it is difficult to obtain consistent product quality.

In particular, films made from presently known molding compositions do not have fully satisfactory thermoforming properties; they also have a high Shore hardness, which does not always allow the desired soft, leather-like surface to be achieved.

It is an object of the present invention to provide thermoplastic molding compositions which are easy to prepare in consistent quality and which can be further processed into shaped articles, in particular into films, without loss of quality arising, for example, through degradation reactions. A further object is to provide molding compositions from which it is possible to produce shaped articles, in particular films, which are distinguished by good thermoforming properties (high elongation at break and high tear resistance) and by low Shore hardness.

We have found that this object is achieved by means of the thermoplastic molding compositions defined at the outset.

Furthermore, molding compositions comprising specific embodiments of component C) have been found. In addition, the use of the polymer mixtures for producing films and shaped articles, and films and shaped articles made from these materials, have been found.

Component A) is present in the novel compositions in an amount, based on the sum of components A), B) and C), of from 30 to 98, preferably from 40 to 90 and particularly preferably from 50 to 82% by weight. This component is a particulate graft copolymer built up from an elastomeric graft core $a_K$ ("soft component") and a shell $a_S$ ("hard component") grafted thereto.

The graft core $a_K$) is present in a proportion of from 30 to 90, preferably from 40 to 80 and in particular from 50 to 75% by weight, based on component A).

The graft core $a_K$) is obtained by polymerization of a monomer mixture of, based on $a_K$),
  $a_K/1$) from 80 to 99.99, preferably from 85 to 99.5 and particularly preferably from 90 to 99% by weight of one or more $C_1$–$C_{10}$-alkyl acrylates,
  $a_K/2$) from 0.01 to 20, preferably from 0.5 to 10 and particularly preferably from 1 to 5% by weight of a monomer with crosslinking effect, and
  $a_K/3$) from 0 to 20, preferably from 0 to 5% by weight of one or more other monomers.

Useful alkyl acrylates $a_K/1$) are especially those derived from ethanol, 2-ethylhexanol or in particular from n-butanol. One single alkyl acrylate or a mixture of a number of alkyl acrylates with different alkyl radicals may be used.

Monomers with crosslinking effect $a_K/2$) are bi- or polyfunctional comonomers, for example butadiene, isoprene, divinyl esters of dicarboxylic acids, such as succinic acid and adipic acid, diallyl and divinyl ethers of dihydric alcohols, such as ethylene glycol and butane-1,4-diol, diesters of acrylic acid and methacrylic acid with the above-mentioned dihydric alcohols, 1,4-divinylbenzene and triallyl cyanurate. Particular preference is given to the tricyclodecenyl acrylate of the formula below

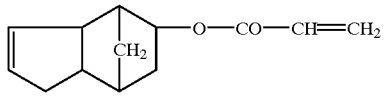

which is known as dihydrodicyclopentadienyl acrylate, and to allyl acrylates and allyl methacrylates.

Component $a_K$) in the molding compositions can also contain other monomers $a_K/3$) which vary the mechanical and thermal properties of the core within a particular range, with reduction in the amounts of the monomers $a_K/1$) and $a_K/2$). The following may be mentioned as examples of such monoethylenically unsaturated comonomers $a_K/3$):

vinylaromatic monomers, such as styrene and styrene derivatives of the formula I

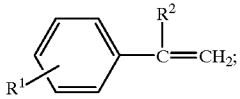
(I)

where $R^1$ and $R^2$ are hydrogen or $C_1$–$C_8$-alkyl;

methacrylonitrile, acrylonitrile;

acrylic acid, methacrylic acid, dicarboxylic acids, such as maleic acid and fumaric acid, and their anhydrides, such as maleic anhydride;

nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide;

$C_1$–$C_4$-alkyl methacrylates, such as methyl methacrylate, ethyl methacrylate, n-propyl methacrylate, isopropyl methacrylate, n-butyl methacrylate, isobutyl methacrylate, sec-butyl methacrylate, tert-butyl methacrylate and hydroxyethyl acrylate;

aromatic and araliphatic esters of acrylic acid and of methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;

unsaturated ethers, such as vinyl methyl ether and mixtures of these monomers.

The graft shell $a_S$) is obtained by polymerization of a monomer mixture comprising, based on $a_S$), $a_S/1$) from 50 to 100, preferably from 60 to 95 and particularly preferably from 65 to 85% by weight of a styrene compound of the formula I

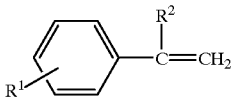
(I)

where $R^1$ and $R^2$ are hydrogen or $C_1$–$C_8$-alkyl
or a $C_1$–$C_8$-alkyl acrylate or methacrylate
or a mixture of the styrene compound and the $C_1$–$C_8$-alkyl acrylate or methacrylate, and $a_S/2$) from 0 to 50, preferably from 15 to 35% by weight of one or more other monomers.

The styrene compound of the formula (I) (component $a_S/1$)) is preferably styrene, α-methylstyrene or ring-$C_1$–$C_8$-alkylated styrenes, such as p-methylstyrene or tert-butylstyrene. Styrene is particularly preferred.

The styrene compounds can be replaced by or mixed with $C_1$–$C_8$-alkyl acrylates and/or methacrylates, in particular those derived from methanol, ethanol, n-propanol, isopropanol, sec-butanol, tert-butanol, isobutanol, pentanol, hexanol, heptanol, octanol and 2-ethylhexanol, and especially from n-butanol. Methyl methacrylate is particularly preferred.

The shell $a_S$) can also comprise other comonomers $a_S/2$), with reduction in the amounts of the monomers $a_S/1$). For component $a_S/2$), the same recommendations apply as for component $a_K/3$).

In addition, other monomers which may be mentioned for $a_S/2$) are: maleimide, N-methyl-, N-phenyl- and N-cyclohexylmaleimide, and monomers which are modified with acid or basic functional groups, eg. the acids mentioned for $a_K/3$) and their anhydrides and the nitrogen-functional monomers mentioned for $a_K/3$). For component $a_S/2$), among the monomers mentioned preference is given to acrylonitrile, methacrylonitrile and maleimide, and particular preference is given to acrylonitrile.

The graft shell $a_S$) is preferably built up from styrene or methyl methacrylate, or from a mixture of from 40 to 90% by weight of methyl methacrylate with acrylonitrile as the remainder, or from a mixture of from 65 to 85% by weight of styrene with acrylonitrile as the remainder.

The graft copolymers A) are obtainable in a manner known per se, preferably by emulsion polymerization at from 30 to 80° C. Suitable emulsifiers here are, for example, alkali metal alkyl- or alkylarylsulfonates, alkyl sulfates, fatty alcohol sulfonates, salts of higher fatty acids with from 10 to 30 carbon atoms, sulfosuccinates, ether sulfonates or resin soaps. Preference is given to alkali metal alkylsulfonates or fatty acids with from 10 to 18 carbon atoms.

In preparing the dispersion, it is preferable to use an amount of water which gives the finished dispersion a solids content of from 20 to 50% by weight.

Preferred polymerization initiators are free-radical generators, for example peroxides, such as preferably peroxosulfates, and azo compounds, such as azobisisobutyronitrile. However, redox systems, in particular based on hydroperoxides, such as cumene hydroperoxide, can also be used. In conjunction with these, molecular weight regulators, such as ethylhexyl thioglycolate, n- and tert-dodecyl mercaptan, terpinols and dimeric α-methylstyrene, may be used.

In order to maintain a constant pH, preferably from 6 to 9, buffers, such as $Na_2HPO_4/NaH_2PO_4$ or sodium bicarbonate, may be added.

The emulsifiers, initiators, regulators and buffers are employed in conventional amounts, so that more detailed instructions are not necessary.

The graft core can particularly preferably also be prepared by polymerization of the monomers $a_K$) in the presence of a fine-particle rubber latex (the "seed-latex" polymerization method).

In principle, it is also possible to prepare the graft base by a process other than emulsion polymerization, eg. by bulk or solution polymerization, and then to emulsify the polymers obtained. Microsuspension polymerization is also suitable, oil-soluble initiators, such as lauroyl peroxide and tert-butyl perpivalate being preferable. The methods for this are known.

The graft shell $a_S$) can be built up in one step, with components $a_S/1$) and $a_S/2$) generally being added simultaneously or progressively. It may also be built up in a number of steps, with, for example, component $a_S/1$) being polymerized first, followed by component $a_S/2$) or a mixture of $a_S/1$) and $a_S/2$). The $a_S/1$):$a_S/2$) mixing ratio can be constant or can vary continuously or step-wise over the course of the addition.

Furthermore, it is known to the person skilled in the art that the graft monomers $a_S/1$) and $a_S/2$) may be added all at once (batchwise), or as a progressive feed at constant or variable rate. Combinations of these methods of addition are frequently encountered.

The reaction conditions are preferably balanced with respect to one another in a manner known per se so that the polymer particles have a substantially uniform diameter $d_{50}$ in the range from 60 to 1500, in particular from 150 to 1000 nm.

In place of a single graft copolymer A), it is also possible to use various such polymers for producing the novel thermoplastic compositions, in particular those having significantly differing particle size. Mixtures of this type with a bimodal size distribution have technical advantages during further processing. Useful particle diameters are in the range from 60 to 200 nm on the one hand and from 300 to 1000 nm on the other hand.

Also useful are graft copolymers with a number of "soft" and "hard" shells, eg. of $a_K)$-$a_S)$-$a_K)$-$a_S)$ or $a_S)$-$a_K)$-$a_S)$ construction, especially in cases where the particle size is relatively large.

Any non-grafted polymers formed from the monomers $a_S$) during the grafting process, generally less than 10% by weight of $a_S$), are counted as part of the mass of component A).

The novel molding composition comprises component B) in a proportion of from 1 to 50, preferably from 5 to 40 and particularly preferably from 10 to 30% by weight, based on the sum of components A), B) and C). Component B) is a thermoplastic polymer comprising $b_1$) from 50 to 100, preferably from 55 to 95 and particularly preferably from 60 to 85% by weight of styrene or α-methylstyrene, $b_2$) from 0 to 50, preferably from 5 to 45 and particularly preferably from 15 to 40% by weight of acrylonitrile, and $b_3$) from 0 to 50, preferably from 0 to 40% by weight of one or more other monomers, each based on component B). Useful monomers $b_3$) are those mentioned for component $a_K/3$) and $a_S/2$).

Preferred monomers $b_3$) are alkyl and aryl methacrylates and methacrylamides. Preferred monomers $b_3$) which may be mentioned are: methyl methacrylate, maleic anhydride, maleimide, and lesser amounts of glycidyl methacrylate, acrylic acid, methacrylic acid and dimethylaminoethyl acrylate.

Component B) preferably comprises, for example, a copolymer of from 60 to 95% by weight of styrene and from 5 to 40% by weight of acrylonitrile. A copolymer of from 60 to 85% by weight of styrene and from 15 to 40% by weight of acrylonitrile is particularly preferred.

The polymers B), also generally termed SAN polymers because of their main components styrene and acrylonitrile, are known and in some cases commercially available. They generally have a viscosity number VN (measured according to DIN 53 726 at 25° C., 0.5% by weight in dimethylformamide) of from 40 to 160 ml/g, corresponding to a mean molar mass (weight-average) of approximately from 40,000 to 2,000,000. They are obtained in a conventional manner by bulk, solution, suspension, precipitation or emulsion polymerization. Details of these processes are described, for example, in Kunststoffhandbuch, Ed. R. Vieweg and G. Daumiller, Vol. V "Polystyrene", Carl-Hanser-Verlag Munich 1969, p. 118ff.

The polymer B) can also be a mixture of different copolymers of styrene and/or α-methylstyrene and acrylonitrile, varying, for example, in their content of acrylonitrile or in their mean molar mass.

The molding compositions contain a proportion of component C), based on the sum of components A), B) and C), of from 1 to 70, preferably from 5 to 50 and particularly preferably from 8 to 40% by weight. Component C) is a hydrogenated elastomeric block copolymer comprising at least two blocks A, which form a "hard" phase and contain, in their polymer chains, units of a vinylaromatic monomer, and at least one block B/A situated between the blocks A, which forms a "soft phase" and contains, randomly in its polymer chain, units of a vinylaromatic monomer (A) and of a diene (B), where the glass transition temperature $T_g$ of the block A is above 25° C. and that of the block B/A is below 25° C. and the phase-volume ratio of block A to block B/A is chosen so that the proportion of the hard phase in the entire block copolymer is from 1 to 40% by volume and the proportion by weight of the diene is less than 50% by weight.

All, or virtually all, of the olefinic double bonds in the elastomeric block copolymer C) have been hydrogenated.

Details on the construction and preparation of component C) can be found below and also in DE-A-44 20 952, which is expressly incorporated herein by way of reference.

The soft phase (block B/A) is obtained by random copolymerization of vinylaromatic monomers and dienes in the presence of a polar co-solvent.

A hydrogenated block copolymer C) may be, for example, one of the formulae 1–4:

(1) $(A-B/A)_n$-A, preferably A-B/A-A;

(2) $X-[(B/A-A)_n]_{m+1}$, preferably $X-[-B/A-A]_2$;

(3) $X-[(B/A-A)_n-B/A]_{m+1}$;

(4) $Y-[(B/A-A)_n]_{m+1}$; preferably $Y-[-B/A-A]_2$;

where A is the vinylaromatic block and B/A is the soft phase, ie. the block built up randomly from diene and vinylaromatic units, X is the radical of an n-functional initiator, Y is the radical of an m-functional coupling agent and m and n are integers from 1 to 10.

Preference is given to a block copolymer whose soft phase B/A is divided into blocks (5) $(B/A)_1$-$(B/A)_2$;

(6) $(B/A)_1$-$(B/A)_2$-$(B/A)_1$;

(7) $(B/A)_1$-$(B/A)_2$-$(B/A)_3$;

where the vinylaromatic/diene ratio in the individual blocks B/A may be different or may vary continuously (in particular may increase) within a single block within the limits $(B/A)_1 \rightarrow (B/A)_3$, where the glass transition temperature Tg of each sub-block is below 25° C. Variant (7) is particularly preferred.

A particularly preferred hydrogenated block copolymer C) has the formula

(A-B/A)$_n$-A.                                                      (1)

Very particular preference is given to hydrogenated block copolymers C) of the formula

A-B/A-A.                                                            (1)

Preference is also given to a block copolymer having a number of blocks B/A and/or A of different molar mass in each molecule.

Preferred vinylaromatic compounds for the purposes of the invention are styrene, α-methylstyrene and vinyltoluene and mixtures of these. Preferred dienes are butadiene and isoprene, piperylene, 1-phenylbutadiene and mixtures of these.

A particularly preferred monomer combination is butadiene and styrene. All of the weight and volume information given below refers to this combination.

The B/A block is built up from approximately 75–30% by weight of styrene and 25–70% by weight of butadiene. Particular preference is given to a soft block comprising from 35 to 70% of butadiene and from 65 to 30% of styrene.

In the case of the monomer combination styrene-butadiene, the proportion by weight of the diene in the entire block copolymer is from 15 to 50% by weight, and that of the vinylaromatic component is correspondingly from 85 to 50% by weight. Particular preference is given to butadiene-styrene block copolymers having a monomer composition of from 25 to 50% by weight of diene and from 75 to 50% by weight of vinylaromatic compound.

The block copolymers are prepared by anionic polymerization in a non-polar solvent with addition of an aprotic polar co-solvent. Preferred solvents are aliphatic hydrocarbons, such as cyclohexane and methylcyclohexane. Particularly preferred co-solvents are ethers, for example tetrahydrofuran and aliphatic polyethers, such as diethylene glycol dimethyl ether, and tertiary amines, such as tributylamine and pyridine. The polar co-solvent is added to the non-polar solvent in a small amount, for example from 0.5 to 5% by volume. Particular preference is given to tetrahydrofuran in an amount of from 0.1 to 0.3% by volume. Experience has shown that an amount of about 0.2% by volume is usually sufficient.

The anionic polymerization is initiated using organometallic, in particular organolithium, compounds, such as methyllithium, ethyllithium, propyllithium, n-butyllithium, sec-butyllithium and tert-butyllithium. The organometallic compound is added as a solution in a chemically inert hydrocarbon, generally in an amount of from 0.002 to 5 mol %, based on the monomers.

The polymerization temperature can be from 0 to 130° C., the range from 30 to 100° C. being preferable.

According to the invention, the volume proportion in component C) of the soft phase, constructed from diene and vinylaromatic sequences, is from 60 to 99, preferably from 70 to 90 and particularly preferably from 80 to 90%. The blocks A formed from the vinylaromatic monomers form the hard phase, whose volume proportion is correspondingly from 1 to 40, preferably from 10 to 30 and particularly preferably from 10 to 20%.

The soft phases (blocks B and B/A) of component C) usually have a glass transition temperature of from −50 to +25° C., preferably from −50 to +5° C. The glass transition temperature of the hard phase (block A) is preferably above 50° C.

The molar mass of block A is generally from 1000 to 200,000, preferably from 3000 to 80,000 [g/mol]. Blocks A may have different molar masses within a single molecule.

The molar mass of block B/A is usually from 2000 to 250,000, preferably from 5000 to 150,000 [g/mol]. Like block A, block B/A can also have different molar masses within a single molecule.

The coupling center X is formed by reaction of the living anionic chain ends with an at least bifunctional coupling agent. Examples of such compounds are found in U.S. Pat. Nos. 3,985,830, 3,280,084, 3,637,554 and 4,091,053. Preference is given to the use of, for example, epoxidized glycerides, such as epoxidized linseed oil or soya oil; divinylbenzene is also suitable. Dichlorodialkylsilanes, dialdehydes, such as terephthaldehyde, and esters, such as ethyl formate, acetate or benzoate, are suitable specifically for dimerization.

The random block B/A may itself be subdivided into blocks B1/A1-B2/A2-B3/A3- . . . The random block preferably comprises from 2 to 15 random sub-blocks, particularly preferably from 3 to 10 sub-blocks.

The polymerization is carried out in a number of steps and, in the case of monofunctional initiation, is begun, for example, by preparing the hard block A. Part of the monomers is precharged in the reactor and the polymerization is started by addition of the initiator. In order to achieve a defined chain construction, it is advisable although not essential to carry the process to a high degree of conversion (greater than 99%) before the second monomer addition.

The manner of the second monomer addition depends on the selected block construction. In the case of monofunctional initiation, the vinylaromatic compound is, for example, first precharged or directly metered in. After this, the diene and the vinylaromatic compound should be added as simultaneously as possible. The mixing ratio of diene to vinylaromatic compound, the concentration and the chemical structure of the Lewis base, together with the temperature, determine the composition and random construction of the block B/A. According to the invention, the diene is present in a proportion by weight of from 25% to 70% based on the total weight including the vinylaromatic compound. Block A can then be polymerized on by adding the vinylaromatic compound. Alternatively, required polymer blocks can also be bonded with one another through the coupling reaction. In the case of bifunctional initiation, the block B/A is constructed first, followed by the block A.

The reaction is terminated in a manner known per se by addition of a polar compound, such as water or an alcohol, for example ethanol or isopropanol.

The olefinic double bonds which are still present in the polymer and which originate from the diene are likewise hydrogenated in a manner known per se, preferably in homogeneous phase, using hydrogen and a soluble, selective hydrogenation catalyst, such as a mixture of nickel(II) acetylacetonate and triisobutylaluminum, in an inert solvent, such as hexane. The hydrogenation is preferably carried out at from 20 to 200° C., and a hydrogen pressure in the range from 6 to 30 bar is advisable. It is not necessary to hydrogenate all the non-aromatic double bonds; a degree of hydrogenation of 95% is sufficient. Details of the hydrogenation are seen, for example, in DE-A 31 06 959.

The work-up to give the desired hydrogenated polymer C) with molecular weight preferably set at from 50,000 to 300,000, particularly from 70,000 to 180,000 (weight average), is carried out in the usual manner. The solvent is generally removed first, and then the polymer is extruded and granulated.

In addition to components A), B) and C), the thermoplastic molding compositions can also contain additives, such as lubricants and release agents, pigments, dyes, flame retardants, antioxidants, light stabilizers, fillers and reinforcing agents in fiber or powder form and antistats, in the amounts usual for these agents. Particularly when films are to be produced from the novel molding compositions, plasticizer is added, for example copolymers of from 30 to 70% by weight of ethylene oxide and from 70 to 30% by weight of 1,2-propylene oxide which have a mean molecular weight of from 2000 to 8000, in amounts of from 0.5 to 10% by weight, based on the total of components A), B) and C).

The preparation of the novel molding compositions can be carried out by mixing processes known per se, for example by melting in an extruder, Banbury mixer, compounder, roll mill or calender, but the components can also be mixed "cold" without melting, in which case the mixture comprising powder or granules is not melted and homogenized until it is further processed.

Shaped articles of all types, in particular films, can be produced from the molding compositions. The films can be produced by extrusion, roll-milling, calendering and other processes known to the person skilled in the art. By these means, the novel molding compositions are shaped, by heating and/or friction, either by themselves or with addition of plasticizing or other additives, to give a film capable of further processing. The conversion of films of this type into finished products is carried out, for example, by thermoforming.

The films have various applications, in particular in the automotive sector in the design of car interiors, in decorative applications, as leather substitutes in the production of suitcases and bags, and in the furniture sector as covering material for lamination of furniture surfaces.

The novel thermoplastic molding compositions contain no halogen. They are exceptionally free of constituents which can escape by evaporation or exudation, and during further processing they show virtually no undesirable degradative changes, such as, for example, discoloration. Furthermore, they have good mechanical properties. In particular, the films produced from the novel molding compositions have good thermoforming properties (high values for elongation at break and tear resistance) and a pleasant "soft touch" handle.

EXAMPLES

The following components were prepared and/or used (percentages are by weight)
Component A):
Particulate graft polymer comprising crosslinked poly-n-butyl acrylate (core) and styrene-acrylonitrile copolymer (shell)

A mixture of 98 g of n-butyl acrylate and 2 g of dihydrodicyclopentadienyl acrylate and, separately, a solution of 1 g of sodium $C_{12}$–$C_{18}$-paraffinsulfonate in 50 g of water were added to a mixture of 3 g of a polybutyl acrylate seed latex, 100 g of water and 0.2 g of potassium persulfate, over 4 hours at 60° C., after which the polymerization was continued for a further 3 hours. The latex obtained had a mean particle diameter $d_{50}$ of 430 nm with a narrow particle size distribution (Q=0.1).

150 g of this latex were mixed with 60 g of water, 0.03 g of potassium persulfate and 0.05 g of lauroyl peroxide, after which, over a period of 3 hours at 65° C., 20 g of styrene and then, over a period of a further 4 hours, a mixture of 15 g of styrene and 5 g of acrylonitrile were grafted onto the latex particles. The polymer was then precipitated using a calcium chloride solution at 95° C., separated, washed with water and dried in a stream of warm air. The degree of grafting of the polymer was 35% and the particles had a mean diameter $d_{50}$ of 510 nm.

The graft polymer had the following composition (rounded values):

60% by weight of a graft core of polybutyl acrylate, crosslinked,

20% by weight of an inner graft of styrene polymer and

20% by weight of an outer graft of styrene-acrylonitrile copolymer with weight ratio S/AN 3:1.

The seed polymer used at the start was prepared by the process of EP-B 6503 (column 12, line 55, to column 13, line 22) by polymerization of n-butyl acrylate and tricyclodecenyl acrylate in aqueous emulsion, and had a solids content of 40%.

The mean particle size mentioned in the description of component A) is the weight average of the particle sizes.

The mean diameter corresponds to the $d_{50}$ value, according to which 50% by weight of all particles have a smaller, and 50% by weight a larger, diameter than the diameter corresponding to the $d_{50}$ value. In order to characterize the width of the particle size distribution, the $d_{10}$ and the $d_{90}$ values are often stated in addition to the $d_{50}$ value. 10% by weight of all particles are smaller, and 90% by weight are larger, than the $d_{10}$ diameter. Analogously, 90% by weight of all particles have a smaller, and 10% by weight a larger, diameter than the diameter corresponding to the $d_{90}$ value. The quotient $Q=(d_{90}-d_{10})/d_{50}$ s a measure of the width of the particle size distribution. The smaller is Q, the narrower is the distribution.

Component B):

Copolymer of styrene and acrylonitrile

A copolymer of 65% by weight of styrene and 35% by weight of acrylonitrile was prepared by the continuous solution polymerization process as described in Kunststoff-Handbuch, ed. R. Vieweg and G. Danmiller, Vol. V "Polystyrene", Carl-Hanser-Verlag Munich 1969, pp. 122 to 124. The viscosity number VN (determined according to DIN 53 726 at 25° C., 0.5% strength by weight in dimethylformamide) was 80 ml/g.

Component C) (according to the invention):

elastomeric block copolymer

A heatable and coolable 50 l stainless steel autoclave with stirrer was prepared by flushing with nitrogen and scalding with a solution of sec-butyllithium and 1,1-diphenylethylene in cyclohexane, followed by drying. The autoclave was filled with 22.8 l of cyclohexane; 42 ml of sec-butyllithium and 65.8 ml of tetrahydrofuran were then added. Table 1 shows the individual steps of the polymerization.

In each step, the duration of the monomer feed was small in comparison with the duration of the polymerization. The stated starting and/or final temperatures were set by heating and/or cooling of the reactor jacket.

TABLE 1

| Step | 1 | 2 | 3 | 4 | 5 |
|---|---|---|---|---|---|
| Butadiene feed [g] | — | 1120 | 1120 | 1120 | — |
| Styrene feed [g] | 1008 | 1412 | 1412 | 1412 | 1008 |
| Tstart [° C.] | 30 | 77 | 73 | 74 | 74 |
| Tend [° C.] | 77 | 102 | 95 | 88 | 85 |

TABLE 1-continued

| Step | 1 | 2 | 3 | 4 | 5 |
|---|---|---|---|---|---|
| Duration of polymerization [min] | 12 | 14 | 10 | 26 | 14 |

At the end of the reaction (consumption of the monomers) the polymerization was terminated by titration with ethanol until the mixture was colorless, and the mixture was then acidified with a small excess of acid. The product contained 21% of 1,2-vinyl groups.

For hydrogenation, a suspension of 1.5 g of nickel(II) acetylacetonate in 30 ml of toluene and 34 ml of a 20% strength by weight solution of triisobutylaluminum in hexane were added to the resulting polymer solution, and the mixture was exposed to a hydrogen pressure of 15 bar for 20 hours at from 130 to 140° C.

The work-up of the reaction mixture to give the hydrogenated polymer was carried out as usual; it was expedient to remove the solvent in a vented extruder at 200° C. The product obtained was in granule form.

The polymer C) obtained had an

A-B/A-A structure in which the soft phase B/A is subdivided into 3 blocks as in $(B/A)_1$-$(B/A)_2$-$(B/A)_3$ The terms A and B/A are taken to mean the polymer blocks already defined. Block A is a homopolystyrene block, block B/A is a block comprising randomly polymerized styrene and hydrogenated butadiene (=butylene) units. The proportion of butylene units in the soft phase B/A was 20% by weight, and the proportion of styrene units was therefore 80% by weight.

The styrene proportion in the entire polymer C) was 65% by weight.

The proportion of the two hard phases A in the polymer C) was in each case 10.4% by weight, and the proportion of the soft phase B/A was correspondingly 79.2% by weight.

The mean molar mass $\overline{M}_w$ of the polymer C) was about 130,000 g/mol, as determined by gel permeation chromatography (calibrated with polystyrene).

Component C*) (for comparison):

hydrogenated styrene-butadiene copolymer

A solution of 520 g of styrene, 480 g of butadiene and 20 ml of tetrahydrofuran in 4 l of cyclohexane at 0° C. was first mixed slowly with sec-butyllithium in order to deactivate protic impurities. After the start of polymerization, recognizable from a temperature rise of 0.2° C., 0.8 g of sec-butyllithium was immediately added. The heat of polymerization was extracted by evaporative cooling, the rate of cooling being adjusted so that the temperature rose to 120° C. over 30 min. This temperature was maintained for a further 10 min, after which the polymerization was terminated by adding 1 g of ethanol.

For hydrogenation, a suspension of 1.5 g of nickel(II) acetylacetonate in 30 ml of toluene and 34 ml of a 20% strength by weight solution of triisobutylaluminum in hexane were added to the resultant polymer solution, and the mixture was then exposed to a hydrogen pressure of 15 bar for 60 min at from 80 to 110° C.

The work-up of the reaction mixture to give the hydrogenated polymer was carried out as usual; the solvent was expediently removed in a direct degassing apparatus.

The resultant polymer comprised a block which is butadiene-rich (styrene-poor) at its beginning and styrene-rich (butadiene-poor) at its end, ie. there was a progression, and a homopolystyrene block attached to the styrene-rich end of the first block.

The styrene content of the resultant polymer, which is commercially obtainable as Glissoviscal® SG (BASF), was 52% by weight, based on the total weight of the polymer. The proportion of homopolystyrene end-block in the polymer was 13% by weight. The mean molar mass, determined by gel permeation chromatography, of the product prepared in the described manner was 80,000.

Novel compositions and their properties

Mixtures were prepared from components A), B) and C) or C*) and were converted on a roll mill at 200° C. into films of 1 mm thickness.

The following properties of the films were determined:

Tensile strength: the tensile test was carried out according to DIN 53 504 on strips stamped out of the film.

Elongation at break: the elongation at the moment of application of breaking stress was measured in the tensile test according to DIN 53 504 and stated as % of the original dimension of the strip.

Tear propagation resistance: a tear propagation test was carried out according to DIN 53 515 on strips stamped out of the film.

Shore hardness: the Shore hardness according to DIN 53 505 was determined using test apparatus D.

Heat deflection temperature: determined according to DIN 53 461 as Vicat number using measurement method A.

The formulations of the films which were produced, and the test results, are shown in Table 2.

TABLE 2

| Test No. | 1 | 2 comp. |
|---|---|---|
| Formulation [% by weight]: | | |
| Component A) | 80 | 80 |
| Component B) | 10 | 10 |
| Component C) or C*) | 10 C | 10 C* |
| Properties: | | |
| Tensile strength [N/mm²] | 17 | 15 |
| Elongation at break [%] | 170 | 140 |
| Tear propagation resistance [N/mm²] | 50 | 46 |
| Shore hardness D | 45 | 50 |
| Heat deflection temperature: Vicat A [° C.] | 92 | 89 | comp. = for comparison

Films produced from molding compositions comprising a hydrogenated polymer C*) (butadiene-containing block with progression styrene-poor to styrene-rich, joined to a homopolystyrene block) in place of the polymer C) of the invention have a considerably lower elongation at break and a significantly lower tear propagation resistance (test 2 comp.).

In contrast, films comprising the polymer C) of the invention (polystyrene block—3 random polymer blocks of styrene and hydrogenated butadiene—polystyrene block) combine good tensile strength, high elongation at break, good tear propagation resistance, low hardness and high heat deflection temperature (test 1).

We claim:

1. A halogen-free thermoplastic molding composition comprising

A) from 30 to 98% by weight of a graft polymer comprising
  $a_K$) from 30 to 90% by weight of an elastomeric graft core, obtainable by copolymerization of
    $a_K/1$) from 80 to 99.99% by weight of one or more $C_1$–$C_{10}$-alkyl acrylates,
    $a_K/2$) from 0.01 to 20% by weight of a monomer with crosslinking effect, and
    $a_K/3$) from 0 to 40% by weight of one or more other monoethylenically unsaturated monomers,
  $a_S$) from 10 to 70% by weight of a graft shell comprising
    $a_S/1$) from 50 to 100% by weight of a styrene compound of the formula

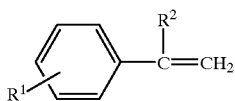

where $R^1$ and $R^2$ are hydrogen or $C_1$–$C_8$-alkyl, or a $C_1$–$C_8$-alkyl acrylate or methacrylate, or a mixture of the styrene compound and the $C_1$–$C_8$-alkyl acrylate or methacrylate, and
    $a_S/2$) from 0 to 50% by weight of one or more other monoethylenically unsaturated monomers,
B) from 1 to 50% by weight of a thermoplastic polymer comprising
  $b_1$) from 50 to 100% by weight of styrene and/or α-methylstyrene,
  $b_2$) from 0 to 50% by weight of acrylonitrile, and
  $b_3$) from 0 to 50% by weight of one or more other monoethylenically unsaturated monomers, and
C) from 1 to 70% by weight of a component C, which is an elastomeric block copolymer in which all or virtually all of the olefinic double bonds have been hydrogenated, consisting essentially of at least two blocks A, which consist essentially of in their polymer chains, units of a vinylaromatic monomer, and have a glass transition temperature above 25° C., and, situated between the blocks A, 2–15 elastomeric block B/A which consists essentially of randomly in its polymer chain,
  units of both a vinylaromatic monomer (A) and a diene (B) and has a random structure and a glass transition temperature Tg below 25° C., where the proportion of the entire block copolymer of the hard phase formed from the blocks A is from 1 to 40 volume % and the proportion of the diene is less than 50% by weight.

2. The thermoplastic molding composition of claim 3, wherein, in the block copolymer C), the $T_g$ of the hard phase (blocks A) is above 50° C. and the $T_g$ of the soft phases (blocks B/A) is below 5° C.

3. The thermoplastic molding composition of claim 1, wherein, in the block copolymer C), the vinylaromatic monomer is selected from the group consisting of styrene, a-methylstyrene, vinyltoluene and mixtures of these, and the diene is selected from the group consisting of butadiene, isoprene and mixtures of these.

4. The thermoplastic molding composition of claim 3, wherein, in the block copolymer C), the second or further soft phase (block B/A) is formed from a copolymer of a vinylaromatic with a diene.

5. The thermoplastic molding composition of claim 3, wherein the hydrogenated block copolymer C) is constructed according to the formula $$(A\text{-}B/A)_n\text{-}A$$

where A is the vinylaromatic block, B/A is the block constructed randomly from diene and vinylaromatic units, and n is an integer from 1 to 10.

6. The thermoplastic molding composition of claim 3 in which the soft phase (block B/A) of the hydrogenated block copolymer C) is subdivided into blocks
  (1) $(B/A)_1$-$(B/A)_2$
  (2) $(B/A)_1$-$(B/A)_2$-$(B/A)_1$
  (3) $(B/A)_1$-$(B/A)_2$-$(B/A)_3$ whose vinylaromatic/diene ratio is different in the individual blocks B/A or varies continuously within a single block within the limits $(B/A)_1 \rightarrow (B/A)_3$ where the glass transition temperature $T_g$ of each sub-block is below 25° C.

7. The thermoplastic molding composition of claim 3, wherein the hydrogenated block copolymer C) is constructed according to the formula $$A\text{-}B/A\text{-}A$$

where A is the vinylaromatic block, and B/A is the block constructed randomly from diene and vinylaromatic units.

8. The thermoplastic molding composition of claim 3, wherein component B) is a copolymer of from 60 to 95% by weight of styrene and from 5 to 40% by weight of acrylonitrile.

9. A film or shaped article made from the thermoplastic molding composition of claim 3.

10. Internal automobile decorations made from the films or articles of claim 9.

* * * * *